United States Patent
Lin et al.

(10) Patent No.: US 9,460,390 B1
(45) Date of Patent: *Oct. 4, 2016

(54) ANALYZING DEVICE SIMILARITY

(75) Inventors: Derek Lin, San Mateo, CA (US); Alon Kaufman, Bnei-Dror (IL); Yael Villa, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/332,889

(22) Filed: Dec. 21, 2011

(51) Int. Cl.
 *G06N 7/00* (2006.01)
 *G06N 5/04* (2006.01)

(52) U.S. Cl.
 CPC .............. *G06N 5/04* (2013.01); *G06N 7/005* (2013.01)

(58) Field of Classification Search
 None
 See application file for complete search history.

(56) References Cited

U.S. PATENT DOCUMENTS

| | | | |
|---|---|---|---|
| 6,415,282 B1 * | 7/2002 | Mukherjea | G06F 17/30256 707/737 |
| 6,480,837 B1 * | 11/2002 | Dutta | G06F 17/30864 |
| 6,539,395 B1 * | 3/2003 | Gjerdingen | G06F 17/30743 |
| 6,754,662 B1 * | 6/2004 | Li | G06F 17/30949 707/693 |
| 6,835,931 B2 * | 12/2004 | Wright | G01N 23/203 250/307 |
| 6,917,952 B1 * | 7/2005 | Dailey | G06F 17/2715 |
| 6,990,628 B1 * | 1/2006 | Palmer | G06F 17/2211 707/999.003 |
| 6,990,685 B1 * | 1/2006 | Christensen | G06F 9/4408 713/2 |
| 7,376,643 B2 * | 5/2008 | Zeng | G06F 17/30864 |
| 7,533,094 B2 * | 5/2009 | Zhang | G06F 17/3069 |
| 7,630,986 B1 * | 12/2009 | Herz | G06Q 10/10 |
| 7,634,741 B2 * | 12/2009 | Klein | G06F 17/30398 715/810 |
| 7,668,405 B2 * | 2/2010 | Gallagher | G06F 17/30244 382/305 |
| 7,783,581 B2 * | 8/2010 | Hosoi | G06K 9/6255 706/12 |
| 7,849,092 B2 * | 12/2010 | Slaney | G06F 17/30026 707/713 |
| 8,005,767 B1 * | 8/2011 | Cassella | G06K 9/6221 706/12 |
| 8,024,343 B2 * | 9/2011 | Gallagher | G06F 17/30265 382/118 |
| 8,285,719 B1 * | 10/2012 | Long | G06N 7/005 707/737 |
| 8,386,505 B2 * | 2/2013 | Gallagher | G06F 17/30265 382/118 |
| 8,468,158 B2 * | 6/2013 | Kumar | G06F 17/30867 707/737 |

(Continued)

OTHER PUBLICATIONS

Scott Deerwester, et al., "Indexing by Latent Semantic Analysis," Journal of the American Society for Information Science (1986-1998); Sep. 1990; 41, 6; ABI/INFORM Global, p. 391.*

(Continued)

*Primary Examiner* — Kakali Chaki
*Assistant Examiner* — Fuming Wu
(74) *Attorney, Agent, or Firm* — Krishnendu Gupta; Jason A. Reyes (57) ABSTRACT

A method is used in analyzing device similarity. Data describing a device is received and a similarity analysis is applied to the data. Based on the similarity analysis, a measure of similarity between the device and a previously known device is determined.

18 Claims, 4 Drawing Sheets

(56) References Cited

U.S. PATENT DOCUMENTS

| | | | | |
|---|---|---|---|---|
| 8,565,529 B2* | 10/2013 | Chang-Tsun | | G06K 9/40 382/190 |
| 8,601,003 B2* | 12/2013 | Gates | | G06F 17/30053 707/749 |
| 8,667,047 B2* | 3/2014 | Jackson | | H04L 41/0893 709/200 |
| 9,292,793 B1* | 3/2016 | Lin | | G06N 5/04 |
| 2002/0002899 A1* | 1/2002 | Gjerdingen | | G06F 17/30743 84/667 |
| 2002/0091655 A1* | 7/2002 | Agrafiotis | | G06K 9/6232 706/26 |
| 2003/0048946 A1* | 3/2003 | Foote | | G06K 9/6218 382/173 |
| 2003/0185443 A1* | 10/2003 | Jinnai | | G06K 9/64 382/181 |
| 2003/0185450 A1* | 10/2003 | Garakani | | G06K 9/0014 382/232 |
| 2003/0217066 A1* | 11/2003 | Kayahara | | G06F 17/30675 |
| 2003/0228842 A1* | 12/2003 | Heinonen | | H04L 63/083 455/41.2 |
| 2004/0091933 A1* | 5/2004 | Stoughton | | C12Q 1/6809 435/7.1 |
| 2005/0234880 A1* | 10/2005 | Zeng | | G06F 17/30616 |
| 2005/0250552 A1* | 11/2005 | Eagle | | H04M 1/7253 455/567 |
| 2005/0281237 A1* | 12/2005 | Heinonen | | H04L 29/06 370/338 |
| 2006/0269143 A1* | 11/2006 | Kozakaya | | G06K 9/00288 382/218 |
| 2007/0217676 A1* | 9/2007 | Grauman | | G06K 9/4671 382/170 |
| 2008/0037876 A1* | 2/2008 | Galperin | | G06F 17/30247 382/203 |
| 2008/0114750 A1* | 5/2008 | Saxena | | G06F 17/30687 |
| 2008/0137950 A1* | 6/2008 | Park | | G06K 9/00335 382/168 |
| 2008/0177640 A1* | 7/2008 | Gokturk | | G06Q 30/02 705/26.62 |
| 2008/0256230 A1* | 10/2008 | Handley | | H04L 63/145 709/224 |
| 2008/0294770 A1* | 11/2008 | Jackson | | H04L 41/0893 709/224 |
| 2009/0082637 A1* | 3/2009 | Galperin | | G06F 19/321 600/300 |
| 2009/0106614 A1* | 4/2009 | Desineni | | G01R 31/318321 714/732 |
| 2009/0254971 A1* | 10/2009 | Herz | | G06Q 10/10 726/1 |
| 2009/0319513 A1* | 12/2009 | Terao | | G06F 17/30781 |
| 2010/0057843 A1* | 3/2010 | Landsman | | H04L 63/0407 709/203 |
| 2010/0070917 A1* | 3/2010 | Gates | | G06F 17/30053 715/810 |
| 2010/0076958 A1* | 3/2010 | Gates | | G06F 17/30053 707/722 |
| 2010/0098306 A1* | 4/2010 | Madabhushi | | G06K 9/0014 382/128 |
| 2010/0211605 A1* | 8/2010 | Ray | | G06F 17/30023 707/780 |
| 2010/0280920 A1* | 11/2010 | Scott | | G01S 5/0027 |
| 2010/0284604 A1* | 11/2010 | Chrysanthakopoulos | | G06K 9/52 382/153 |
| 2010/0332210 A1* | 12/2010 | Birdwell | | G06F 17/30442 703/22 |
| 2010/0332475 A1* | 12/2010 | Birdwell | | G06F 17/30333 707/737 |
| 2011/0093449 A1* | 4/2011 | Belenzon | | G06N 7/005 707/708 |
| 2011/0243449 A1* | 10/2011 | Hannuksela | | G06K 9/00221 382/190 |
| 2011/0268323 A1* | 11/2011 | Gallagher | | G06F 17/30265 382/118 |
| 2012/0203717 A1* | 8/2012 | Xu | | H04L 9/3236 706/12 |
| 2012/0224711 A1* | 9/2012 | Kim | | H04L 67/18 381/77 |
| 2013/0013603 A1* | 1/2013 | Parker | | G06F 17/3071 707/737 |
| 2013/0054603 A1* | 2/2013 | Birdwell | | G06K 9/6224 707/738 |
| 2013/0138635 A1* | 5/2013 | Park | | G06F 17/30241 707/723 |
| 2013/0237242 A1* | 9/2013 | Oka | | H04W 4/02 455/456.1 |
| 2013/0238681 A1* | 9/2013 | Oka | | H03M 7/3062 708/250 |

OTHER PUBLICATIONS

Scott Deerwester et al., "Indexing by Latent Semantic Analysis," Journal of the American Society for Information Science (1986-1998); Sep. 1990; 41, 6; ABI/INFORM Global, pp. 391-407.*

* cited by examiner

FIG. 1

| SOURCE | ELEMENTS |
|---|---|
| LOGIN HTTP SESSION INFO | COOKIE |
| | USER AGENT STRING |
| | IP GEO/IP |
| JAVASCRIPT QUERIED RESULTS | ACCEPT LANGUAGE |
| | USER LANGUAGE |
| | BROWSER LANGUAGE |
| | SYSTEM LANGUAGE |
| | TIME ZONE |
| | SOFTWARE PLUGIN STRING |
| | SCREEN DISPLAY SIZE |

FIG. 2

| | |
|---:|:---:|
| userAgent | mismatch |
| acceptLang | mismatch |
| SysLang | match |
| userLang | mismatch |
| browserLang | null |
| timezone | match |
| software | match |
| screen | match |
| IPGeo | match |

| DIMENSIONS (27) | TRAINING VECTORS | | | | |
|---|---|---|---|---|---|
| uas_match | 1 | 0.7 | 0 | 0 | ... |
| uas_mismatch | 0 | 0 | 1 | 0 | ... |
| uas_null | 0 | 0 | 0 | 1 | ... |
| tz_match | 1 | 0.2 | 0 | 0 | ... |
| tz_mismatch | 0 | 0 | 1 | 0 | ... |
| tz_null | 0 | 0 | 0 | 1 | ... |
| ... | ... | ... | ... | ... | ... |

$$A \bullet B = \|A\| \, \|B\| \cos \theta$$

$$\cos(\theta) = \frac{\sum_j A_j \times B_j}{\sqrt{\sum_j A_j^2} \times \sqrt{\sum_j B_j^2}}$$

FIG. 6

ANALYZING DEVICE SIMILARITY

FIELD OF THE INVENTION

This application relates to analyzing device similarity.

BACKGROUND

Uses for the Internet and the World Wide Web are continually increasing, and have expanded into "secure" areas. Different mechanisms for maintaining security in a network such as the Internet have been developed, such as the Secure Sockets Layer (SSL) security protocol. The SSL protocol uses a public key infrastructure to maintain security. In establishing an SSL connection between a client computer and a server computer hosting a web page, the server computer transmits a certificate to the client computer for verification or validation.

Typically in practice, when a user's Web browser first tries to contact a server for a secure transaction, the server sends its digital certificate to the browser. This certificate includes (among other things) the server's public key, the server's identity, the name of the certificate authority (CA) that signed the certificate and the signature itself (which is a mathematical hash of the certificate encrypted with the CA's private key). To validate the certificate, the browser computes the certificate hash and compares the result with the hash obtained by decrypting the signature using the CA's public key (as well as checking the validity dates and identity included in the certificate against the desired server). To then validate the server, the browser encrypts a message with the public key obtained from the certificate and sends it to the server. If the server can prove it can decrypt that message then it must have the associated private key and the authentication has succeeded. If desired, the server may likewise validate the browser. Once the browser and (optionally) the server is/are satisfied that each is the computer it claims to be, the browser and server can exchange session keys (additional keys that are used to encrypt the data transfers between the computers from then on).

In web-based systems, such as electronic commerce systems, when data is requested by a client from a server, it is often the case that the web server must query a database to locate the requested data.

In such a case, communications between a server and a web browser client typically require authorization of the client, to permit a client access only to certain data stored by the server. Such data may include, for example, contract information or pricing information which is exclusive to that client; other clients of the web server are not entitled to view this information.

One approach to identifying the client to the server is to initially authenticate the client and to then provide a session identifier to the client in the form of a hypertext transfer protocol (HTTP) cookie. A cookie, which is a form of persistent state object, is a small piece of data generated by the server and which is intended to be passed by the client with every subsequent client request to any server in a defined domain. Upon receipt of the request, the server can verify the client's entitlement to the requested information by comparing the contents of the cookie to the client records stored on the server. Such an approach is disclosed, for example, in U.S. Pat. No. 5,875,296 to Shi et al. (Feb. 23, 1999) in which a cookie including a client identifier is used to access an in-memory credential database used to allow or disallow access to files on a distributed file system. Browser uniqueness is also the subject of "How unique is your web browser" by Electronic Frontier Foundation at http://panopticlick.eff.org/browser-uniqueness.pdf.

Data and cookies that are transmitted between servers and clients on the Internet are subject to certain security risks unless measures are taken to secure communications between the client and server. An unauthorized user at a routing point or at another server in a cookie's domain may capture the packets transmitted between the client and the server and read the data contained in the transmitted cookie. Alternatively, a user may edit the contents of his or her own authorized cookie and alter the session data contained therein to construct a fraudulent session. For example, if the session data includes a contract identification number, the user could edit the cookie to insert a different number and thereby gain access to unauthorized data or resources when the edited cookie is transmitted to the server in a subsequent request. An unauthorized user may furthermore "steal" a valid cookie from an authorized user, and use the cookie to replay a valid session, thereby gaining unauthorized access to the server (a "replay attack").

Further, as the size and diversity of the Internet grows, so do the devices and applications that use the network. Originally, network applications such as web browsers, terminal clients, and e-mail readers were the only programs accessing the Internet. Now, almost every new device or application has a networking component, whether it is to obtain content, updates, manage licensing, or report usage statistics.

Principal component analysis (PCA) is a well-known multivariate statistical analysis technique. PCA is frequently used for data analysis and dimensionality reduction. PCA has applications throughout science, engineering, and finance.

PCA determines a linear combination of input variables that capture a maximum variance in data. Typically, PCA is performed using singular value decomposition (SVD) of a data matrix. In PCA, the principal components are uncorrelated, which facilitates data analysis.

SUMMARY

A method is used in analyzing device similarity. Data describing a device is received and a similarity analysis is applied to the data. Based on the similarity analysis, a measure of similarity between the device and a previously known device is determined.

BRIEF DESCRIPTION OF THE DRAWING

The above and further advantages of the present invention may be better understood by referring to the following description taken into conjunction with the accompanying drawings in which identical numbers for elements appearing in different drawing figures represent identical or similar elements throughout the figures.

DETAILED DESCRIPTION

Described below is a technique for use in analyzing device similarity, which technique may be used to help provide, among other things, a device similarity measure or score for device identification.

Conventionally, it is common to use a rule-based method that requires extensive tuning with inflexible performance. For example, conventionally when presented with two set of device components, a rule declares some deterministic conditions that components must satisfy before saying the devices are deterministically the same. The conditions in the conventional system are manually designed and tweaked by hand. The deterministic binary result in the conventional system does not allow control for a tradeoff between false positive and false negative rates.

Figure 1:
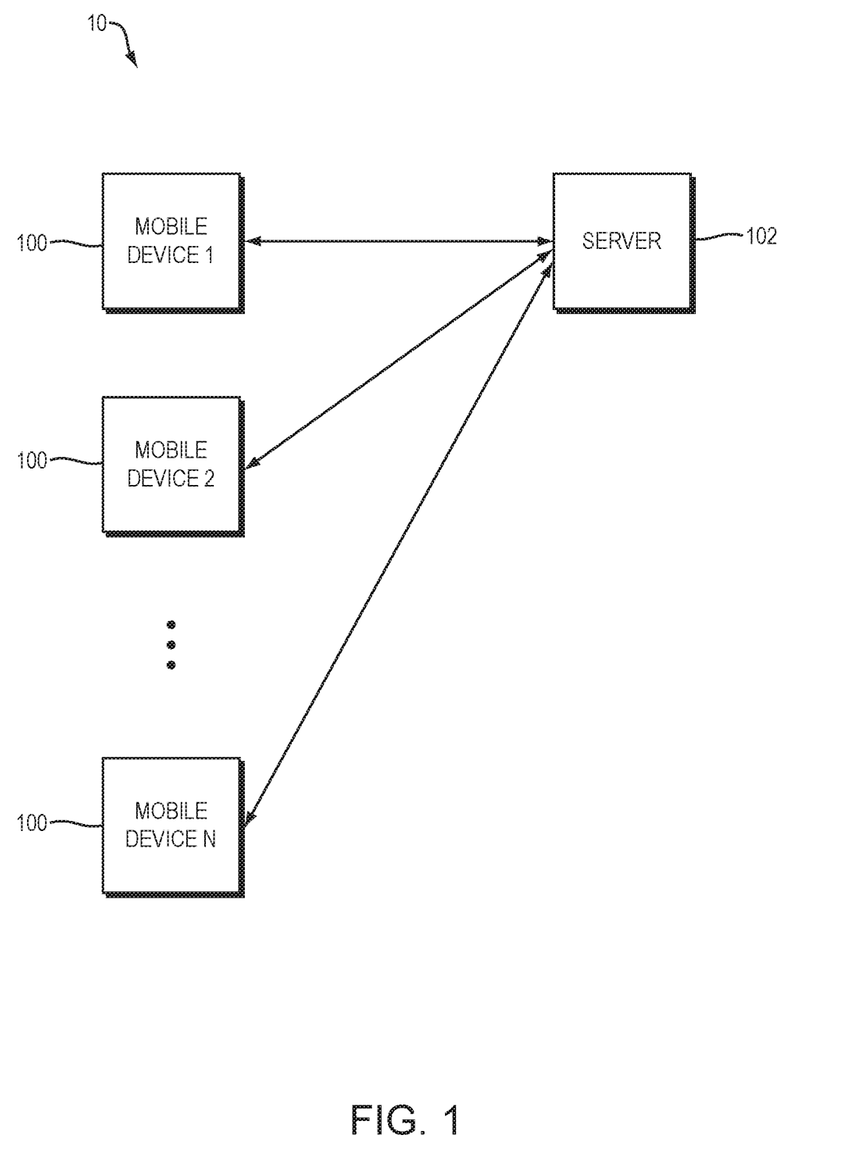
FIG. 1 is an example of an embodiment of a system that may be used in connection with the techniques described herein.

Referring to FIG. 1, shown is an example of an embodiment of a computer system that may be used in connection with performing the techniques described herein. Data System 10 has Mobile Devices 1, 2, . . . , N 100, and Server 102. Data from Mobile Device 100 may be stored on Server 102, and data stored on Server 102 may be retrieved by Mobile Device 100.

Mobile devices may include any of a variety of devices, such as cell phones, smart phones (e.g., Android phone Blackberry, iPhone, etc.), laptops, netbooks, tablets, tablet PCs, iPADs, and personal digital assistants (PDAs), among others.

Mobile Devices 100 may be access Server 102 through a variety of means. Such connections are well known in the art, and may include 3G, General Packet Radio Service (GPRS), and WiFi, among others. It is anticipated that Mobile Devices 100 may utilize newer access technologies as they are developed to access Server 102.

Though FIG. 1 illustrates a single Server 102, multiple servers may be utilized. Further, Data System 10 may be a cloud computing system, and Server 102 may be part of a cloud computer system. Cloud computing is well understood in the art, and generally includes provisioning dynamically scalable and often virtualized resources as a service over the internet. Thus, in a cloud computing system, Server 102 may be a virtual server and actually reside over multiple physical servers. Similarly, in a cloud computing system, there may be multiple Server 102s, and the multiple Server 102s may be virtual servers residing in a single physical server, or in multiple physical servers.

With respect to device matching similarity scoring and background and motivation, identifying whether a user is accessing from a previously detected device ("past seen device") in the user's history has important web-based applications, especially for e-commerce. For example, it can be important to determine whether a device that is now attempting to access data of Server 102 is the same as past seen Mobile Device 1 or past seen Mobile Device 2.

Conventionally, a cookie or flash cookie remains the primary identifier to track a user's devices. However, rising privacy concerns and new regulations are slowly weakening the effectiveness of the use of cookies. By contrast, in at least some implementations using the technique described herein, a new method is provided to track a user's device via components of the user's device signature, without (in at least some cases) embedding or tagging the device with any stored information. According to the method, a data-driven modeling framework is constructed to detect probabilistically whether the unknown device is one of the past seen devices.

Figure 2:
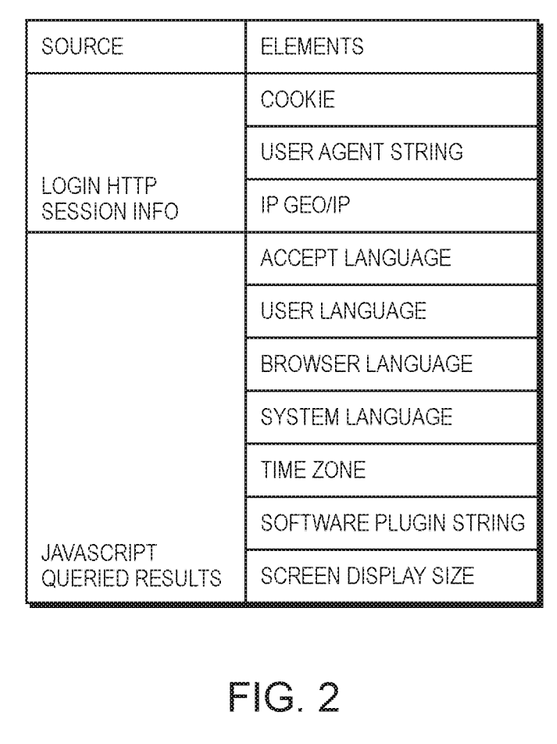
FIGS. 2-6 are examples of embodiments of organizations of data that may be used in connection with the techniques described herein.

When a user's device is connected to a web application, information about a number of device data components is available to the system. This information includes browser-level information such as IP address, user agent string, and accept language setting, and application requested information run by javaScript such as screen size, software fingerprints, and time zone, as shown in FIG. 2. A conventional proposed system or method attempts to make a decision about whether the device was seen before based on a collection of deterministic rules using these elements. Such conventional rule-based methods check whether selected components match and employ some hard parameters for decision making. For example, a conventional rule may specify that if the "user agent string" matches, a weight of 0.8 is assigned to this fact; if "accept language" matches, a weight of 0.2 is assigned to this fact, if "time zone" does not match, zero weight is assigned to this fact; and then all weights are summed to make up a final score. A threshold is then applied to this score for decision in the conventional method. Conventional static rules such as these generally suffer from problems inherent in rule-based decision systems, including the need for human parameter tuning and inflexibility in controlling false positive and false negative rate as a result of hard decisions.

In contrast to conventional methods such as rule-based methods that require human tuning, at least some implementations based on the technique use a data-driven method that outputs a soft similarity score between first and second devices based on their observed device elements. The first device is the current unknown device, and the second device is a past known user's device. If the similarity score is high, the current unknown device is classified as the same as the earlier known device; otherwise, the unknown device is classified as a new device. In at least some cases, this score is used as a threshold to flexibly control the tradeoff between false positive and false negative rate. Depending on the implementation, in real time, the score is produced by a mathematical model that calculates a similarity "distance" between the current unknown device and the known devices. The model may be trained offline from actual web data automatically without human intervention.

In at least one implementation based on the technique, a critical aspect is how the mathematical model is trained and taught, specifically with respect to the use of principal component analysis in a framework that simultaneously deal with issues of:

Missing data elements. Data elements may not be available due to a user issue (e.g., the user disables javaScript in the browser) or site implementation issues (e.g., the client does not send certain device elements across the board). Static rules assuming availability of a full data set will not work well.

Adapting to element importance. A device element that is popular has a lower value or importance in device matching. For example, if a large majority of devices in a population have a system language setting of "us-en" (US English), the fact that the language setting is a match tells little about whether the device is the same or a different device. A scheme to account for element importance based on its frequency in population is desired.

Adapting to dynamics of changing element value frequency or importance. The popularity of a device element value can change over time. For example, a newly released browser version may increase in popularity over time. A procedure to self-learn changing element frequency is desired.

Accommodating to new device element additions. New device elements may be added over time and in the future. A new device element will have a new pattern in usage. It is desirable to have an automated way to account for and take advantage of richer device elements efficiently.

Lack of truth labels. Device matching is a classification problem: same device or different device. A classification problem typically requires truth labels in training data so that a model can explicitly learn patterns associated with a desired classification outcome. This is commonly called a supervised learning method. However, there are no such labels in the data here; for example, no one can tell the analysis whether a pair of devices are the same or not with absolute certainty. Accordingly, it is desirable to have a learning method that learns in an unsupervised way.

With respect to modeling technology, the device similarity problem may be cast to a modeling problem that automatically learns from data. To enable modeling, data is first prepared, a learning algorithm is applied to learn the structure of the data, and then a distance measure is constructed to calculate the device match similarity score.

Figure 3:
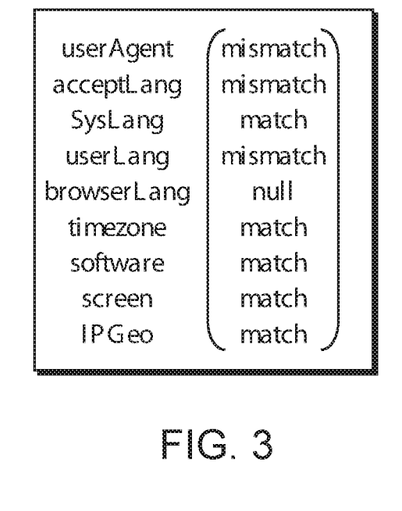

With respect to data preparation, the system first collects unlabeled pairs from devices in which in each pair is observed a vector of observed matching status for each element. FIG. 3 illustrates an example vector of observed statuses for a device with nine elements. (With reference to FIG. 2, in cases in which there are more types of device elements that a server can collect, e.g., keyboard layout, CPU type, clock speed, one or more of these types of device elements may be used as well or instead as part of a device element makeup in this general framework. In such cases, the vector as shown in FIG. 3 may be extended to cover these additional elements).

The data vector is then augmented to encode the same information numerically. Every element is represented by the numeric dimensions—one for match, one for mismatch, and one for null (no data is available). All three dimensions can take on a mutually exclusive value of 0 or 1, such that when the dimension for 'match' is 1, it is necessarily true that dimensions for 'mismatch' and 'null' are null, and vice versa. In this way, the information of observed statuses are captured numerically.

Figure 4:
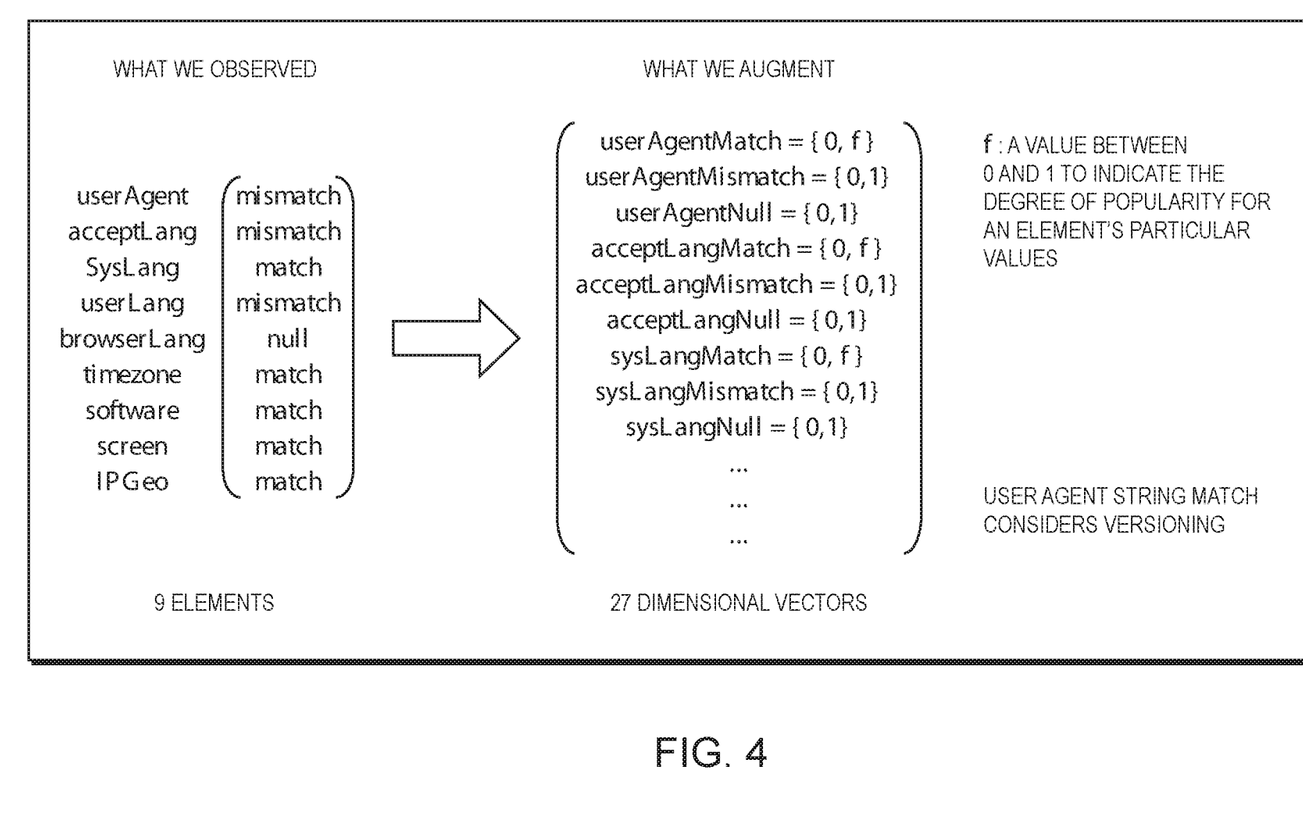

In the case where the 'match' dimension is 1 and the underlying element value used is very popular, this information is further encoded in by introducing a penalty such that its value is less than 1. In this way, the system de-emphasizes the fact that a popular element value is matched so the fact contributes less in weight to the final similarity scoring. FIG. 4 illustrates an example of training data vector augmentation and a summary where a set of nine observed statuses are numerically encoded to a 27-dimensional vector that is ready to be used for modeling.

In at least one implementation based on the technique, the augmented data vectors can be collected in either of the two ways below.

1. In real time. At a user's login, the current device is paired up against each past device; for every pair, the augmented data vector is constructed as illustrated by example in FIG. 4. In real time every data vector is checked against a database where unique data vectors are stored. The database is updated if new data vectors are observed. The database then maintains a set of training data vectors ready for modeling.

2. Offline. At times, e.g., periodically, a large number of users are sampled. For each user, pairs of devices are constructed randomly to make the augmented data vectors as shown by example in FIG. 4. There will be a large number of data vectors. After duplicate vectors are removed, the resulting set is a set of training data vectors ready for modeling.

Figure 5:
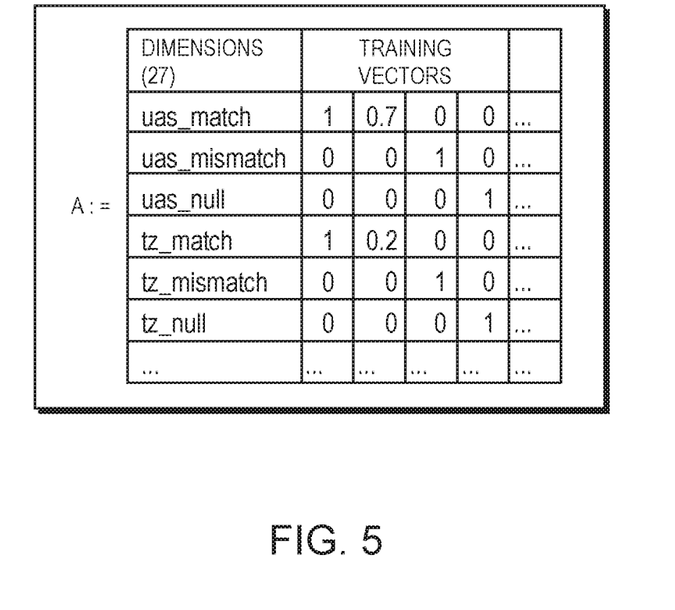

With respect to a learning algorithm, the collection of data vectors prepared as described above is stored in a matrix A, illustrated by example in FIG. 5, which shows an input matrix for singular value decomposition (SVD) as described below. Matrix A is geometrically viewed as vectors in Euclidean space. Each vector represents an observation made from a pair of devices. These vectors have hidden labels on whether they belong to the same device or different devices. A principal component analysis technique may be used to remove noise and transform the data to a new space to retain just enough information where most the most informative viewpoint of data becomes visible. An analogy is a game of hand shadow where a three dimensional object is projected or transformed to a two dimensional space where an informative view is revealed.

Mathematically, given matrix A of high dimension, it is desirable to project A to a lower dimensional space or a latent space in a principal component analysis procedure using SVD. With SVD, A can be decomposed to 3 matrices with certain properties.

$$A = U * S * V^T$$

After a number k is chosen for the number of dimensions to project to, A is approximated by $$A \approx U_k * S_k * V_k^T$$

The matrices $U_k$ and $S_k$ are the result of learning, effectively capture the structure of the latent space, and are used to project future data vector to this space. If q is the input data vector, the projected vector q' is $$q' = q_T * U_k * S_k^{-1}$$

Figure 6:
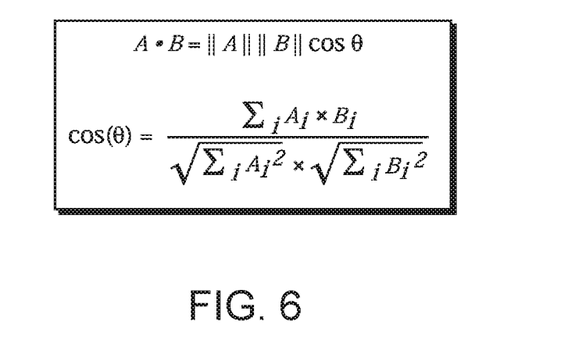

With respect to distance measure defined in the latent space, with a properly selected number of dimensions, the latent space has an informative viewpoint where vectors are separated into two clusters according to a distance metric. In this space, the system can identify the pair of vectors that are maximally away from each other. A proper distance metric to use in the latent space is cosine similarity angle. With reference also to FIG. 6, for vectors A and B, their cosine similarity is $\cos(\theta)$.

In this pair of vectors that are maximally apart, one of these vectors corresponds to an original high dimensional vector belonging to an observation where all or nearly all device elements matched—same device. The other vector corresponds to an original high dimensional vector where all or nearly all device elements are mismatched—difference device.

The latent vector corresponding to same device is identified. This vector is used as the origin. Deviation from the origin in cosine similarity is defined as our desired device match similarity score.

With respect to other considerations, given a pair of devices, it is necessary in at least some implementations to decide the match status for each element. One simple alternative is to use s simple string comparison such as strcmp( ) in C language library. However, special attention is paid to the user agent string such that a later user string in time is treated as the same as an earlier user agent string if the later one:

is exactly the same as the earlier one,
is almost same as the earlier one except that one or more of its sub-components has a higher version number (e.g., user upgraded), or
is almost same as the earlier one except for the existence of new sub-components.

As shown by this example, a simple string match may not always suffice or be preferable; other deep user agent string analysis variants may be necessary and/or possible.

With respect to example applications using the technique described herein, many e-commerce applications can benefit from the use of device similarity scoring as described herein. For example, in an on-line banking security application, a decision to challenge or deny access to a user may be based on whether the current device matches a previously known device with a similarity score within a threshold. In a case in which a device is defined with non-cookie elements, an incidence of possible cookie theft can be flagged if a current device does not have a high similarity score to a previously known device with the same cookie.

In web session management, instead of cookies, device identification based on scoring may be used to store data about a user's navigation patterns, including across multiple visits. In advertising applications, tracking devices based on scoring may enable merchants to store data about visitors' browsing habits that allow them to build user profiles, which advertisers may use to target users with display advertisements.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for use in analyzing device similarity, the method comprising:
   receiving data describing a set of devices, wherein the set of devices includes an unknown device and a previously known device, wherein the data includes a plurality of components associated with the set of devices, wherein the components include device hardware element data and application data, wherein each component of the plurality of components is measured by weight of popularity and frequency, and wherein the weight of each component of the plurality of components changes dynamically based on changing of the popularity and the frequency of use of the plurality of components;
   based on the data, collecting unlabeled pairs of components in connection with the set of devices in which each pair is observed matching status for each component, wherein the said collecting enables preparation of multi-dimensional vectors for use in connection with training vectors stored in a matrix, wherein each component is represented in the multi-dimensional vectors by the group consisting of matching components, mismatching components, and missing components;
   projecting, by a principal component analysis using singular value decomposition, the matrix to a lower dimensional space or latent space;
   based on a cosine similarity angle, determining a pair of vectors maximally apart in the latent space;
   determining, from the pair, the vector corresponding to a high dimensional vector where all or nearly all components match;
   utilizing the said determined vector as an origin; and
   determining a deviation from the origin for defining a device match similarity score.

2. The method of claim 1, wherein the measure is used to identify whether a user is accessing from known detected device.

3. The method of claim 1, wherein the measure is used for e-commerce.

4. The method of claim 1, wherein a data-driven modeling framework detects probabilistically whether the device is previously known device.

5. The method of claim 1, wherein depending on the measure of similarity, the device is classified as the same as previously known device.

6. The method of claim 1, wherein the measure of similarity is based on offline automatic training from web data.

7. The method of claim 1, wherein the measure of similarity accounts for importance of an element based on a frequency of the element in a population.

8. The method of claim 1, wherein the measure of similarity accommodates new device element additions.

9. The method of claim 1, wherein the measure of similarity is based on an unsupervised learning method.

10. A system for use in analyzing device similarity, the system comprising:
   first logic receiving data describing a set of devices, wherein the set of devices includes an unknown device and a previously known device, wherein the data includes a plurality of components associated with the set of devices, wherein the components include device hardware element data and application data, wherein each component of the plurality of components is measured by weight of popularity and frequency, and wherein the weight of each component of the plurality of components changes dynamically based on changing of the popularity and the frequency of use of the plurality of components;
   based on the data, second logic collecting unlabeled pairs of components in connection with the set of devices in which each pair is observed matching status for each component, wherein the said collecting enables preparation of multi-dimensional vectors for use in connection with training vectors stored in a matrix, wherein each component is represented in the multi-dimensional vectors by the group consisting of matching components, mismatching components, and missing components;
   third logic projecting, by a principal component analysis using singular value decomposition, the matrix to a lower dimensional space or latent space;
   based on a cosine similarity angle, fourth logic determining a pair of vectors maximally apart in the latent space;

fifth logic determining, from the pair, the vector corresponding to a high dimensional vector where all or nearly all components match;

sixth logic utilizing the said determined vector as an origin; and seventh logic determining a deviation from the origin for defining a device match similarity score.

11. The system of claim 10, wherein the measure is used to identify whether a user is accessing from known detected device.

12. The system of claim 10, wherein the measure is used for e-commerce.

13. The system of claim 10, wherein a data-driven modeling framework detects probabilistically whether the device is previously known device.

14. The system of claim 10, wherein depending on the measure of similarity, the device is classified as the same as previously known device.

15. The system of claim 10, wherein the measure of similarity is based on offline automatic training from web data.

16. The system of claim 10, wherein the measure of similarity accounts for importance of an element based on a frequency of the element in a population.

17. The system of claim 10, wherein the measure of similarity accommodates new device element additions.

18. The system of claim 10, wherein the measure of similarity is based on an unsupervised learning method.

* * * * *